(12) United States Patent
Baldauf et al.

(10) Patent No.: US 9,005,570 B2
(45) Date of Patent: Apr. 14, 2015

(54) METHOD FOR TREATING A CARBON DIOXIDE-CONTAINING WASTE GAS FROM AN ELECTROFUSION PROCESS

(75) Inventors: Manfred Baldauf, Erlangen (DE); Thomas Matschullat, Eckental (DE)

(73) Assignee: Siemens Aktiengesellschaft, Munich (DE)

(*) Notice: Subject to any disclaimer, the term of this patent is extended or adjusted under 35 U.S.C. 154(b) by 6 days.

(21) Appl. No.: 13/979,761

(22) PCT Filed: Jan. 2, 2012

(86) PCT No.: PCT/EP2012/050017
§ 371 (c)(1),
(2), (4) Date: Oct. 1, 2013

(87) PCT Pub. No.: WO2012/095329
PCT Pub. Date: Jul. 19, 2012

(65) Prior Publication Data
US 2014/0023577 A1    Jan. 23, 2014

(30) Foreign Application Priority Data

Jan. 13, 2011   (DE) .......................... 10 2011 002 615

(51) Int. Cl.
*C01B 3/24* (2006.01)
*B01D 53/62* (2006.01)
*B01D 53/76* (2006.01)
(Continued)

(52) U.S. Cl.
CPC ............... *B01D 53/62* (2013.01); *B01D 53/76* (2013.01); *B01D 2251/208* (2013.01); *B01D 2256/16* (2013.01); *B01D 2256/20* (2013.01); *B01D 2257/504* (2013.01); *B01D 2259/65* (2013.01); *C21C 5/5294* (2013.01); *C21C 2100/02* (2013.01); *C21C 2100/06* (2013.01); *F27D 17/008* (2013.01); *Y02C 10/04* (2013.01)

(58) Field of Classification Search
CPC ....................................................... B01D 53/62
USPC .................................................. 423/644, 650
See application file for complete search history.

(56) References Cited

U.S. PATENT DOCUMENTS

| 3,976,472 A | 8/1976 | Linder |
| 3,985,544 A | 10/1976 | Collin et al. |
| 4,244,732 A | 1/1981 | Brauns |

(Continued)

FOREIGN PATENT DOCUMENTS

| DE | 2133860 | 1/1972 |
| DE | 102011002615.0 | 1/2011 |

(Continued)

OTHER PUBLICATIONS

German Office Action for German Priority Patent Application No. 10 2011 002 615.0, issued on Mar. 12, 2013, 14 pages.

(Continued)

*Primary Examiner* — Paul Wartalowicz
(74) *Attorney, Agent, or Firm* — Staas & Halsey LLP

(57) ABSTRACT

A method for treating a carbon dioxide-containing waste gas from an electrofusion process, in which a hydrocarbon-containing gas is fed to a waste gas and the carbon dioxide in the waste gas is converted at least partially into carbon monoxide and hydrogen in a reaction and the carbon monoxide-hydrogen mixture is stored for an additional combustion process.

18 Claims, 2 Drawing Sheets

(51) Int. Cl.
*C21C 5/52* (2006.01)
*F27D 17/00* (2006.01)

(56) References Cited

U.S. PATENT DOCUMENTS

| | | | |
|---|---|---|---|
| 5,294,244 A * | 3/1994 | Allerton et al. | 75/401 |
| 5,498,487 A * | 3/1996 | Ruka et al. | 429/425 |
| 2004/0239014 A1* | 12/2004 | Fuchs | 266/186 |
| 2010/0136443 A1* | 6/2010 | Vincitore | 429/423 |

FOREIGN PATENT DOCUMENTS

| | | |
|---|---|---|
| JP | 2000-212615 | 8/2000 |
| JP | 2003-166013 | 6/2003 |
| JP | 2010-196141 | 9/2010 |
| JP | 2010-223573 | 10/2010 |
| WO | 85/01567 | 4/1985 |
| WO | 99/00522 | 1/1999 |
| WO | 2010/042023 | 4/2010 |
| WO | 2010/046211 | 4/2010 |
| WO | PCT/EP2012/050017 | 1/2012 |

OTHER PUBLICATIONS

English language International Search Report for PCT/EP2012/050017, mailed on Jul. 9, 2012, 2 pages.

\* cited by examiner

METHOD FOR TREATING A CARBON DIOXIDE-CONTAINING WASTE GAS FROM AN ELECTROFUSION PROCESS

CROSS REFERENCE TO RELATED APPLICATIONS

This application is based on and hereby claims priority to International Application No. PCT/EP2012/050017 filed on Jan. 2, 2012 and German Application No. 10 2011 002 615.0 filed on Jan. 13, 2011, the contents of which are hereby incorporated by reference.

BACKGROUND

The invention relates to a method for treating a carbon dioxide-containing waste gas from an electric smelting process.

During operation of a conventional electric arc furnace (EAF) hot waste gases escape with a temperature of more than 1000° C. To remove pollutants and residues from combustible components the gas is initially subjected to re-combustion. Subsequently the waste gas is mixed with air, known as factory air, from the surroundings of the furnace, which has a very high proportion of dust. All the dust is removed from the waste gas by an electrostatic dust separator or by a bag filter system. For this purpose the waste gas must be cooled to a temperature of less than 180° before filtering.

With a shaft electric arc furnace the enthalpy of the furnace waste gas is used for scrap preheating. This results in increased concentrations of pollutants (e.g. VOC, dioxins, furans or the like) so that re-combustion is necessary to destroy these pollutants. Subsequently the waste gases must be rapidly cooled (quenched) to avoid renewed formation of the pollutants. Dust removal, as described above, is carried out thereafter. In accordance with the related art the heat is removed from the waste gas by water cooling and/or mixing the gas with cold, dust-laden factory air and no further use is made of it. The waste heat is removed by cooling and not used for other processes. A heat exchanger may possibly be employed in a few plants to incorporate the waste gas for generation of steam. In particular the carbon dioxide contained in the waste gases is not converted, but is discharged in the chimney into the environment.

JP 2010 223573 A discloses a method for treatment of a waste gas from iron or steel production, e.g. from electric arc furnaces. The carbon dioxide-containing gas is reformed by an endothermic reaction with a hydrocarbon-containing gas, e.g. methane into carbon monoxide and hydrogen. The resulting gas is then used as a combustion gas.

Furthermore U.S. Pat. No. 3,976,427 A discloses a method for metal production in an electric furnace. The carbon dioxide-containing waste gas is cooled by a reaction, with water and/or hydrocarbons for example with the formation of carbon monoxide and hydrogen.

SUMMARY

One possible object lies in improving the recovery of the waste heat occurring during the operation of an electric arc furnace by comparison with the related art and at the same time reducing the $CO_2$ discharge occurring during the process.

The inventors propose a method for treating a carbon dioxide-containing waste gas from the scrap iron smelting process, a hydrocarbon-containing gas is fed to the waste gas. This hydrocarbon-containing gas reacts with the carbon dioxide which is present in the waste gas in a reaction producing at least partly carbon monoxide and hydrogen. This carbon monoxide-hydrogen mixture is preferably used without further separation together with the other waste gas components for a further combustion process, in which case it can be stored beforehand if necessary. This further combustion process can, but does not absolutely have to be, a component of the method in which the treated waste gas occurs.

Through the proposed method the carbon dioxide ($CO_2$) arising is reduced and is fed in converted form once more to the combustion process.

This method is in particular expedient if the carbon dioxide in the waste gas enters into an endothermic reaction with the hydrocarbon-containing gas and the waste gas is cooled by this reaction. In a preferred embodiment the carbon monoxide-hydrogen mixture (referred to hereafter simply as combustion gas) has a higher combustion value than the introduced hydrocarbon-containing gas (referred to hereafter as reforming gas). This leads to the advantageous endothermic reaction already mentioned.

Thus a significant proportion of the polluting carbon dioxide is removed from the waste gas by the proposed method and it can be fed in a converted form as combustion gas to a further combustion process. Thus the heat energy of the waste gas is converted into chemical energy of the created combustion gas.

It has proved to be expedient to use methane, especially in the form of natural gas, as a hydrocarbon-containing reforming gas. In this process a strong endothermic reaction starts up for the recovery of the carbon dioxide, which leads to the formation of carbon monoxide and hydrogen.

The described process for treating the waste gas of an electric arc furnace is used in a further advantageous embodiment.

In a further more detailed embodiment of the method, said method includes the following: Air is preferably fed to the waste gas from the electric smelting process (for example during electric scrap smelting), this is followed by a subsequent combustion process using a combustion gas, subsequently the hydrocarbon-containing gas, i.e. the reforming gas, is fed to the waste gas and the reaction takes place for converting the reforming gas into the carbon monoxide-hydrogen mixture (referred to hereafter as dry reforming). Subsequently a cooling down of the waste gas in a heat exchange process takes place as well as the subsequent filtering of the cooled waste gas.

In a further embodiment the combustion gas is stored in a gas holder provided for the purpose. It can thus be used for various further combustion processes, including the re-combustion process, and if necessary be utilized for explicit purposes.

In an embodiment the waste gas can have water, preferably in vapor form, mixed with it in addition to the reforming gas. The ratio of carbon monoxide to hydrogen is changed by the supply of additional water, which is expedient for various applications as a combustion gas.

In a further advantageous embodiment the waste gas can be monitored with a gas sensor to regulate the supply of the reforming gas.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
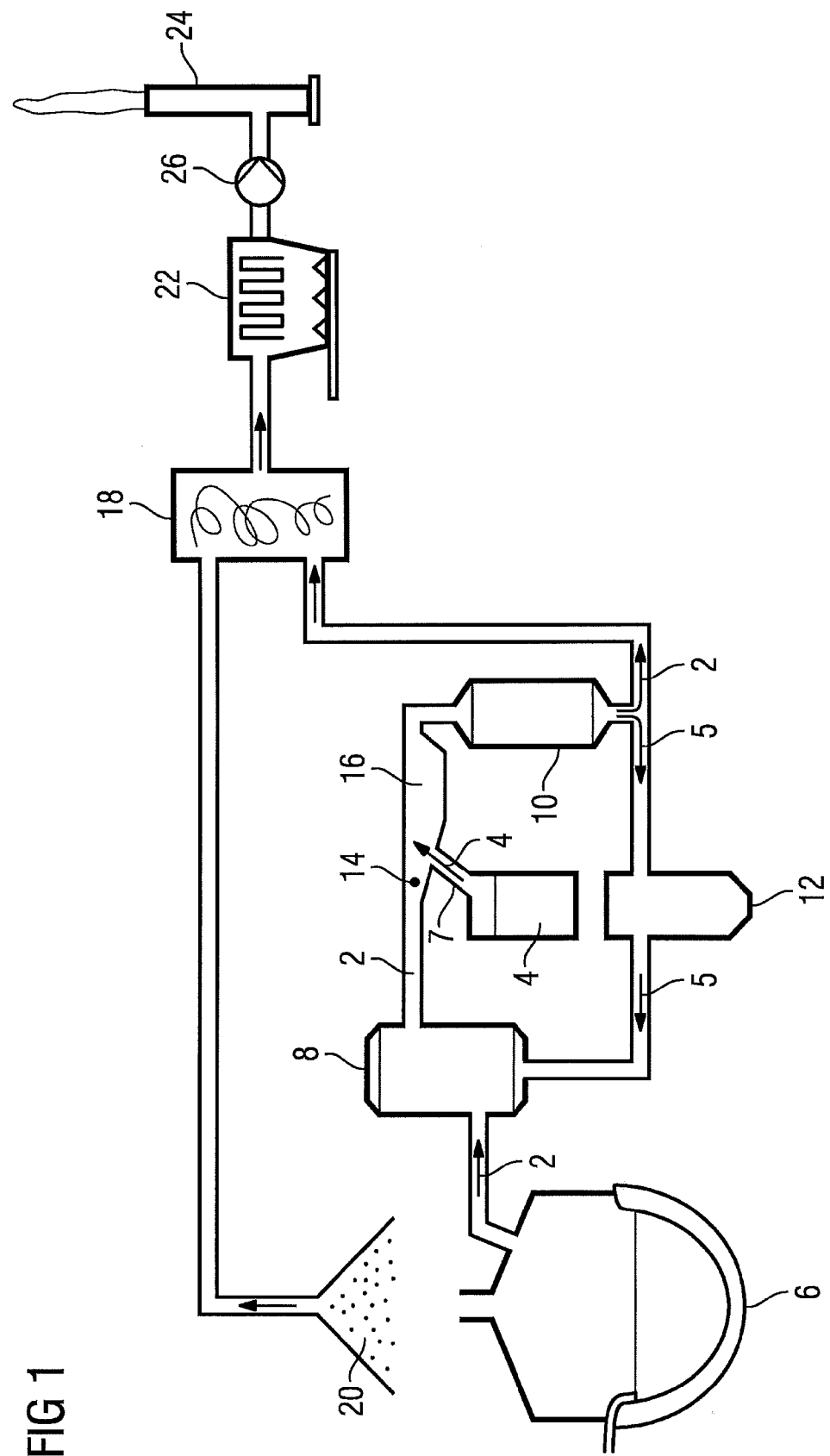
FIG. 1 shows a schematic diagram of a scrap iron smelting process and its waste gas treatment with an incorporated dry reforming process.

Reference will now be made in detail to the preferred embodiments of the present invention, examples of which are illustrated in the accompanying drawings, wherein like reference numerals refer to like elements throughout.

The sequence of waste gas treatment which is employed in scrap iron smelting is to be explained in greater detail below with reference to FIG. 1. Starting from an electric arc furnace 6, the $CO_2$-containing waste gas arising here is conveyed into a waste gas duct. A waste gas sensor 14 monitors the individual chemical components of the waste gas, especially the $CO_2$ portion of the waste gas. What is not shown here is that the waste gas 2 is still being used to heat up further scrap which is being fed to the electric arc furnace 6. The poisonous substances such as dioxins supplied in this process to the waste gas are converted chemically in a re-combustion process 3 and thus rendered harmless. A dry reforming process 16 follows, in which the reforming gas 4 is fed to the waste gas 2, wherein the carbon dioxide is reduced to carbon monoxide. This process will be dealt with in greater detail below. After the reforming process 16 (also called dry reforming) there follows a heat exchange process 10, in which the waste gas 2 is cooled down. The combustion gas 5—as a rule without previous separation from the other waste gas components—is stored together with these components in a gas holder 12 and can be fed back again to the re-combustion process 8 as a combustion gas 5 for example. Likewise the combustion gas 12 can be used as an energy store for further thermal processes, especially processes such as occur in the field of steel production.

If no combustion gas is created and stored, the waste gas 2 is mixed with dust-containing factory air 20 in a mixing chamber 18 and subsequently, in a filter 22, the dust is filtered out of the waste gas 2. With various filter systems the gas temperature should not amount to more than 180° C. A fan 26 conveys the waste gas 2 into a chimney 24.

The carbon dioxide content of the waste gas 2, after it emerges from the electric arc furnace 6, contains different amounts of carbon dioxide depending on operating conditions. Thus the carbon dioxide content of the waste gas 2 is measured via the sensor 14 and in this way the addition of reforming gas 4 to the waste gas 2 is controlled. The reforming gas 4, for which for example natural gas with a high proportion of methane can be used, reacts with the carbon dioxide of the waste gas 2 at least partly in accordance with the following reaction equation (dry reforming 16).

$$CH_4 + CO_2 \rightarrow 2CO + 2H_2 \quad \Delta H = +250 \text{ kJ/mol}$$

This reaction is endothermic, 250 kJ of heat energy per Mol are removed from the environment, i.e. from the waste gas 2. In this way thermal energy which is stored as chemical energy in the combustion gas 5 formed ($CO+H_2$, also called synthesis gas) is converted by this reaction. Consequently thermal energy is converted into chemical energy, since the combustion gas 5 arising in accordance with equation 1 has a higher calorific value than the reforming gas (methane) originally used.

The individual calorific values of the educts and products are as follows:

$CH_4$: 55.5 MJ/kg=888 MJ/kmol
CO: 10.1 MJ/kg=283 MJ/kmol
$H_2$: 143 MJ/kg=286 MJ/kmol The calorific value of a mixture of 2 Mol carbon monoxide and 2 Mol $H_2$ is higher by the aforementioned reaction pencil P of 250 kJ/mol than the calorific value of one Mol $CH_4$ (Methane). The calorific value increase thus amounts to 28% of the introduced calorific value of the methane (255 kJ/mol: 888 kJ/mol).

Depending on the use of the combustion gas 5 it can be sensible to shift the $CO:H_2$ ratio in favor of the hydrogen. In this case water (preferably in vapor form) may possibly likewise be introduced into the reforming gas feed 7. Thus an exothermic CO shift reaction is made possible, in accordance with which $$H_2O + CO \rightarrow CO_2 + H_2 \quad \Delta H = H = -42 \text{ kJ/mol}$$

the ratio of $H_2$ to CO is changed. Although this causes less waste heat to be stored, since an exothermic reaction is involved here, a higher $H_2$ content in the combustion gas 5 is achieved, which is advantageous in a few combustion processes. This is especially the case if in these combustion processes the heat is transported by radiation and not by convection. The $H_2$ combustion results in a higher content of water in the waste gas 2, which through its wide radiation burn promotes heat transport.

Figure 2:
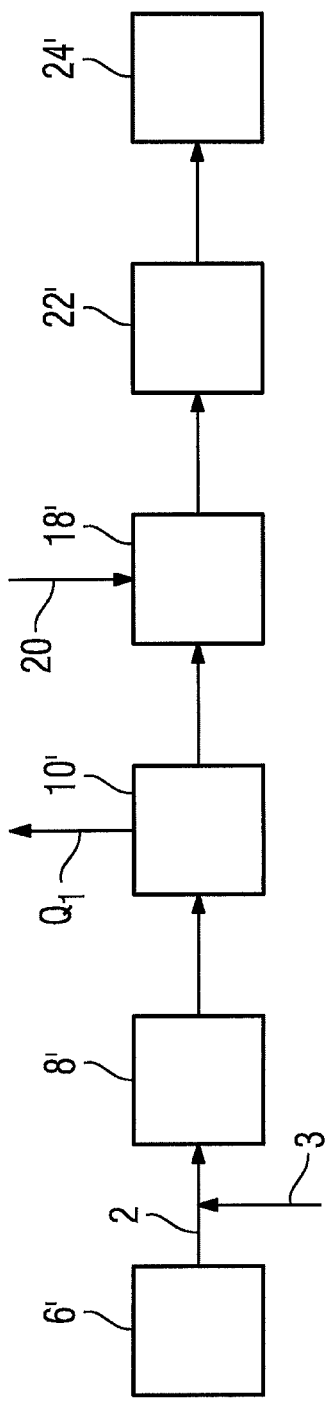
FIG. 2 shows a block diagram to show the waste gas treatment process in the scrap iron smelting in accordance with the prior art and FIG. 3 by comparison with FIG. 2, shows a block diagram of the waste gas handling process with dry reforming.
Figure 3:
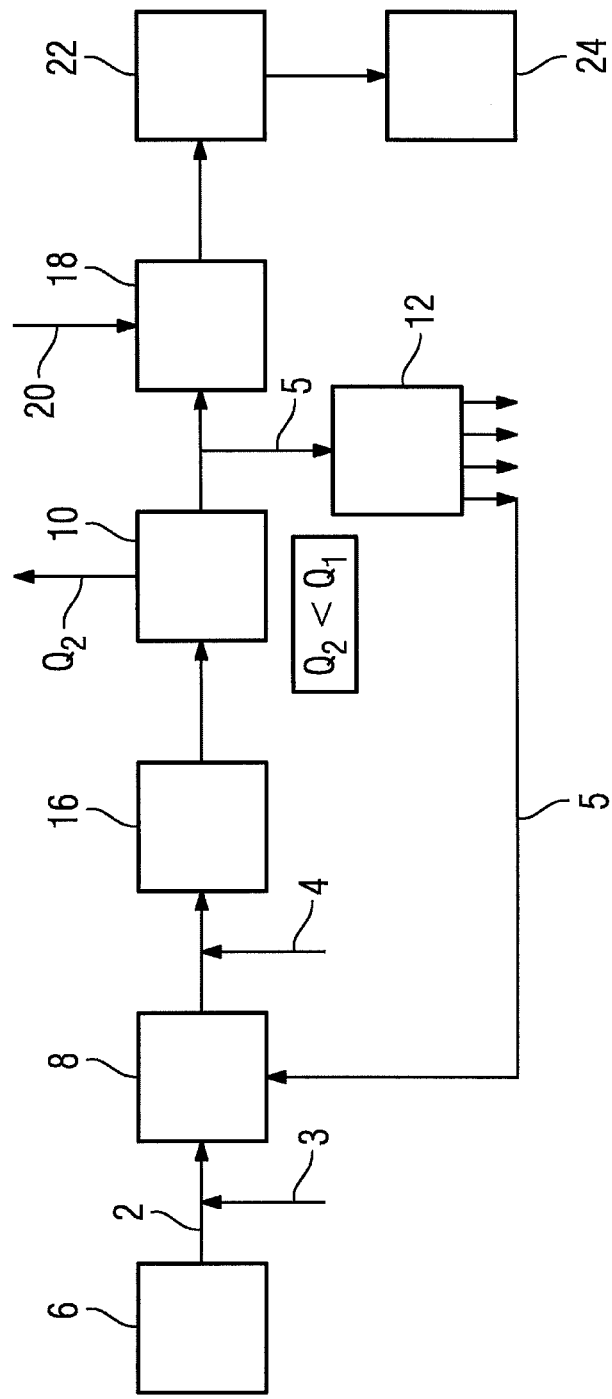

In FIGS. 2 and 3 the process for waste heat treatment just described is compared with reference to two block diagrams. FIG. 2 presents waste gas handling in accordance with the related art, FIG. 3 shows the insertion of dry reforming and the improvements resulting therefrom.

Starting from the electric arc furnace 6 the waste gas 2 is fed to a re-combustion system 8, wherein air 3 is introduced along with it. In a further heat exchange process 10 energy Q1 is emitted to a heat exchange medium. Then in a mixing chamber 18 a mixing with dust-containing air 20 takes place, wherein all of the waste gas is subsequently filtered in a filter system 22 and is emitted to the chimney with the complete dioxide content accrued in the environment.

The process for waste gas treatment with dry reforming in accordance with FIG. 3 differs from that shown in FIG. 2 in that a dry reforming process 16 is introduced between the re-combustion process 8 and the heat exchange process 10, wherein the reforming gas 4 is fed to the waste gas 2 and an endothermic reaction takes place with reduction of the carbon dioxide occurring. The first difference from FIG. 2 lies in the heat Q2 emitted in the heat exchange process 10 being less than the amount of heat Q1 in accordance with the related art. This results from more thermal energy being removed from the waste gas 2 by the endothermic dry reformation 16 than is the case in the related art.

Furthermore the waste gas 2 is stored with the combustion gas 5 in the gas holder 12. The combustion gas 5 can be used for a re-combustion process 8 and in this process can at least partly replace the natural gas used in the related art. The overall amount of carbon dioxide emitted through the chimney 24 is far lower with this method than is the case with the related art.

The waste gases from electric arc furnaces 6 contain during operation in long phases (>50%) very low concentrations of carbon monoxide (CO~5%) and $CO_2$ (<10%). In these operating periods the use of the dry reforming natural gas described above is only worthwhile to some extent since no sufficiently high proportion of combustible components can be created in the waste gas. The reason for this is that the electric arc furnace 6 usually sucks in false air (for example via the slag door or through electrode holes) and the waste gas contains a relatively high concentration of oxygen and nitrogen. In other operating phases the waste gas can contain 20% to 50% carbon monoxide and 10% to 15% carbon dioxide before re-combustion. After re-combustion there is then sufficient carbon dioxide present to create a waste gas with a sufficiently high synthetic gas proportion by the described dry reforming process 16 which is suitable for thermal use in steelworks as described. The use of the proposed method is especially expedient in the latter operating phase.

The energy content of the combustion gas formed (synthesis gas) can be used in suitable plant sections of the steelworks. This can be done for example for power generation in a power station, for process steam generation if necessary in combination with the power generation or as combustion gas for slab, billets or bloom preheating in lifting hearth furnaces or pusher furnaces or in burners (EAF, slab drying and heating, heating station, distributor, continuous casting systems).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for treatment of a carbon dioxide-containing waste gas from an electric smelting process, comprising:
   supplying the waste gas to a re-combustion system and subjecting the waste gas to a re-combustion process performed in the re-combustion system to produce a re-combusted gas;
   feeding a hydrocarbon-containing gas to the re-combusted gas to produce a reacted gas, the hydrocarbon-containing gas converting at least a portion of the carbon dioxide of the re-combusted gas into a carbon monoxide-hydrogen mixture;
   cooling the reacted gas in a heat exchange process; and
   supplying the carbon monoxide-hydrogen mixture to the re-combustion system and using the carbon monoxide-hydrogen mixture as a combustion gas in the re-combustion system.

2. The method as claimed in claim 1, wherein, in addition to the hydrocarbon-containing gas, water is added to the re-combusted gas obtained from the re-combustion system and the water is used in a reaction that converts carbon monoxide and water into carbon dioxide and hydrogen.

3. The method as claimed in claim 1, wherein
   the electric smelting process uses an electric arc furnace that produces the waste gas, and
   in the supplying the waste gas, the waste gas is supplied from the electric arc furnace.

4. A method for treatment of a carbon dioxide-containing waste gas from an electric smelting process, comprising:
   performing a re-combustion process on the waste gas, using a combustion gas, the re-combustion process producing a re-combusted gas containing carbon dioxide;
   feeding a hydrocarbon-containing gas to the re-combusted gas to produce a reacted gas, the hydrocarbon-containing gas converting at least a portion of the carbon dioxide of the re-combusted gas into a carbon monoxide-hydrogen mixture;
   cooling the reacted gas in a heat exchange process to form a cooled reacted gas containing the carbon monoxide-hydrogen mixture; and
   using the cooled reacted gas containing the carbon monoxide-hydrogen mixture in a thermal process.

5. The method as claimed in claim 4, wherein
   the electric smelting process uses an electric arc furnace, and
   the waste gas is produced in the electric arc furnace.

6. The method as claimed in claim 5, wherein the thermal process is another cycle of the re-combustion process and the carbon monoxide-hydrogen mixture is used as a combustion gas in the another cycle of the re-combustion process.

7. The method as claimed in claim 5, wherein the thermal process is another combustion process of a steel smelting process and the carbon monoxide-hydrogen mixture is used as a combustion gas in the another combustion processes.

8. The method as claimed in claim 4, further comprising:
   storing the reacted gas along with the carbon monoxide-hydrogen mixture in a gas holder prior to use in the thermal process.

9. The method as claimed in claim 8, wherein the thermal process is another cycle of the re-combustion process and the carbon monoxide-hydrogen mixture is used as a combustion gas in the another cycle of the re-combustion process.

10. The method as claimed in claim 8, wherein the thermal process is another combustion process of a steel smelting process and the carbon monoxide-hydrogen mixture is used as a combustion gas in the another combustion processes.

11. The method as claimed in claim 4, wherein, in addition to the hydrocarbon-containing gas, water is added to the re-combusted gas.

12. The method as claimed in claim 11, wherein the water serves to convert carbon monoxide into carbon dioxide and hydrogen.

13. The method as claimed in claim 11, wherein
   the water converts carbon monoxide into carbon dioxide and hydrogen, and
   the water serves to control a ratio of carbon monoxide to hydrogen in the reacted gas.

14. The method according to claim 4, wherein the thermal process is a further combustion process.

15. The method as claimed in claim 4, wherein
   when the hydrocarbon-containing gas is fed to the re-combusted gas, carbon dioxide in the re-combusted gas enters into an endothermic reaction with the hydrocarbon-containing gas, and
   the re-combusted gas is cooled by the endothermic reaction to produce the reacted gas.

16. The method as claimed in claim 4, wherein the hydrocarbon-containing gas contains methane.

17. The method as claimed in claim 4, wherein the heat exchange process uses a heat exchanger to exchange heat between the reacted gas and a heat exchange medium.

18. The method as claimed in claim 4, further comprising:
   monitoring a carbon-dioxide content of the waste gas using a gas sensor, to regulate a supply of the hydrocarbon-containing gas.

* * * * *